United States Patent
Marchese

(10) Patent No.: US 7,617,666 B1
(45) Date of Patent: Nov. 17, 2009

(54) LAWN MAINTENANCE DEVICE HAVING WEDGE-SHAPED FRONT SECTION

(76) Inventor: Vincenzo Marchese, 363 Swinburne Road, Burlington, Ontario (CA) L7N 2A2

(*) Notice: Subject to any disclaimer, the term of this patent is extended or adjusted under 35 U.S.C. 154(b) by 0 days.

(21) Appl. No.: 12/135,248

(22) Filed: Jun. 9, 2008

(51) Int. Cl.
*A01D 7/00* (2006.01)
(52) U.S. Cl. ................................................. 56/400.04
(58) Field of Classification Search .............. 56/400.04, 56/400.05, 400.07, 400.11; 294/1.4, 24, 294/52, 55; 37/316, 264; 209/418, 55; 15/257.1
See application file for complete search history.

(56) References Cited

U.S. PATENT DOCUMENTS

| | | | |
|---|---|---|---|
| 323,252 A | 7/1885 | Alexander et al. | |
| 0,827,542 A | 7/1906 | Lawson | |
| 914,087 A | 3/1909 | Sutphen | |
| 979,346 A | 12/1910 | Skjeldrup | |
| 0,985,568 A | 2/1911 | Conover | |
| 1,062,241 A * | 5/1913 | Kelly | 294/52 |
| 1,338,507 A * | 4/1920 | James | 30/30 |
| 1,650,428 A | 11/1927 | Chinneck | |
| 1,682,795 A | 9/1928 | Morgan | |
| 2,276,912 A * | 3/1942 | Andis, Jr. | 30/224 |
| 3,497,973 A * | 3/1970 | Campbell | 37/446 |
| 4,644,740 A | 2/1987 | Lee | |
| 4,813,490 A * | 3/1989 | Proudfoot | 172/378 |
| 4,828,690 A * | 5/1989 | Montez | 209/418 |
| 4,865,372 A | 9/1989 | Gabriel | |
| 4,888,942 A | 12/1989 | Monaco | |
| 4,970,853 A | 11/1990 | Greene, III | |
| 5,069,026 A | 12/1991 | Johnson | |
| 5,142,855 A | 9/1992 | Guidarelli | |
| 5,198,608 A * | 3/1993 | Cahill et al. | 89/1.13 |
| 5,210,965 A * | 5/1993 | Funk et al. | 37/454 |
| 5,431,001 A * | 7/1995 | Lange | 56/400.07 |
| 5,515,625 A * | 5/1996 | Keigley | 37/405 |
| 5,522,629 A | 6/1996 | Loo | |
| 5,611,157 A * | 3/1997 | Ferreira | 37/449 |
| 5,788,299 A | 8/1998 | Wilkinson | |
| 5,791,706 A | 8/1998 | Dolci | |
| 5,809,760 A * | 9/1998 | Rexroat | 56/400.05 |
| 5,816,632 A | 10/1998 | Baldacci | |
| 5,921,596 A * | 7/1999 | Sheriff et al. | 294/1.4 |
| 6,131,381 A | 10/2000 | Milbury | |
| 6,230,424 B1 * | 5/2001 | Renski et al. | 37/446 |
| 6,308,505 B1 * | 10/2001 | Beckett | 56/16.7 |

(Continued)

*Primary Examiner*—Árpád Fábián-Kovács
(74) *Attorney, Agent, or Firm*—Gerald A. Gowan; Gowan Intellectual Property

(57) ABSTRACT

An exemplary lawn maintenance device for the collection of leaves or other debris on a grassed surface, comprises a substantially flat, planar device having a top surface, a lower surface, and a wedge-shaped front section affixed thereto, wherein the top surface of the device is substantially flat and planar, and has a transverse groove or slot therein for receiving the blade of a push shovel. Additionally, the wedge-shaped front section has a series of vertical tines forming a comb-like structure at the leading edge of the device, wherein the comb-like structure consists of a series of extending tine portions, separated by open areas cut within the leading surface of the device. The lower surface comprises a series of ridges and grooves. This configuration allows the device to be fitted to the blade of a push shovel, and the combination can be pushed across the surface of a lawn in order to collect leaves and other debris from the lawn.

12 Claims, 4 Drawing Sheets

U.S. PATENT DOCUMENTS

| | | | |
|---|---|---|---|
| 6,363,633 B1 * | 4/2002 | Holzer et al. | 37/446 |
| 6,434,865 B2 * | 8/2002 | Renski et al. | 37/446 |
| 6,463,727 B2 | 10/2002 | Blyth | |
| 6,722,115 B2 * | 4/2004 | DeWinter | 56/400.12 |
| 6,904,743 B2 | 6/2005 | Vodinh | |
| 2004/0178646 A1 | 9/2004 | Root et al. | |
| 2005/0194158 A1 | 9/2005 | Luik | |
| 2006/0011028 A1 * | 1/2006 | Andis et al. | 83/13 |
| 2006/0059857 A1 * | 3/2006 | Kuhns et al. | 52/749.1 |
| 2007/0157593 A1 | 7/2007 | Belanger | |
| 2007/0169290 A1 | 7/2007 | Fitzgerald | |
| 2007/0289283 A1 * | 12/2007 | Hanas | 56/400.14 |

* cited by examiner

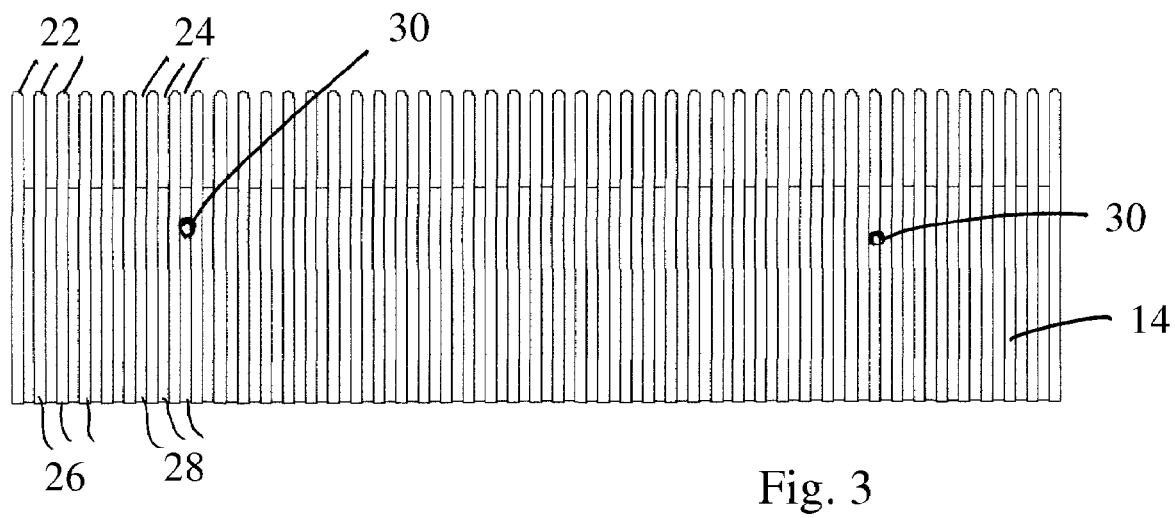
Fig. 3
Fig. 4
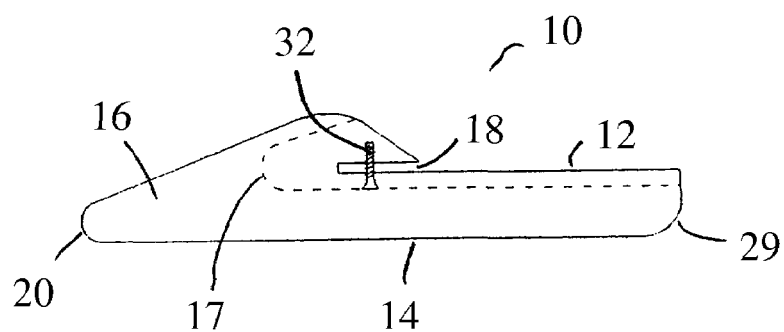

LAWN MAINTENANCE DEVICE HAVING WEDGE-SHAPED FRONT SECTION

FIELD OF THE INVENTION

This invention relates generally to a lawn maintenance device and, more particularly, to a device which facilitates collection and removal of leaves or other similar debris from a lawn.

BACKGROUND OF THE INVENTION

Collection and removal of leaves, or other similar debris such as tree blossoms, fruits, nuts, or the like, is a common task for land and homeowners. The leaves or other debris must be removed from the lawn in a timely fashion. Unless the leaves are removed in a timely fashion they will slowly begin to decompose and can present a haven for moulds, insects and rodents. Furthermore, leaves that are strewn across a lawn and not removed are generally unsightly and can cause damage to the lawn if left for an excessive period of time.

Traditionally leaves and other debris have been collected by means of raking into piles for removal, or in some cases incineration. More recently, others have developed less labour intensive machines that may be used to vacuum leaves from the ground surface and deposit them into bags or other containers so that they may be disposed of or composted. Still others have proposed the use of high powered blowers that move and accumulate leaves. Machines have also been developed that mulch leaves into fine pieces so that they may be more readily broken down and absorbed into the soil.

Unfortunately, none of these prior methods of disposing of leaves and similar debris have met with complete success. Raking tends to be a labour intensive and physically demanding task. While vacuuming leaves into large bags or containers can be effective, the costs associated with the necessary equipment are in many cases prohibitive. Leaf blowers are also relatively expensive and generate excessive noise, to the extent that their use is restricted in some locations. Mulching leaves in-situ can add significantly to the level of thatch within a lawn which in some cases can have a debilitating effect. Finally, much of the equipment that has been developed to replace the need for raking is powered by gasoline engines that can be both costly to operate and environmentally damaging.

There have been many other devices described in the prior art that address the same issues. These include, for example, U.S. Pat. Nos. 323,252, 914,087, 979,346, 4,644,740, 4,865, 372, 4,970,853, 5,069,026, 5,142,855, 6,463,727 and US patent publication 20070157593, which all describe various related devices.

Additionally, Root et al., in US Patent publication No. 2004/0178646 provide a device to assist in collection of this debris, which consists of a dedicated hopper which can be pushed across the lawn to collect the leaves into a larger pile for removal. In one embodiment, the hopper includes a series of "fingers" extending from the hopper which attempt to "rake" through the grass as the hopper is pushed along the lawn surface. However, in the Root device, as well as other prior art devices that use "fingers", the fingers can be prone to catching on larger debris, or even on uneven patches in the lawn. They also rely on maintaining a specific angle in order for the fingers to function properly. Consequently, they are prone to exposing the operator and the device, to impact shock which could lead to breakage of the fingers. This is exacerbated by the fact that, typically, the weight of the entire unit rests on these fingers.

A further disadvantage of the Root device, is it's relatively large size which would be equal to a large shovel. As such, storage of the device when not in use, can be an issue.

As such, an improved device for collection of leaves would be desirable.

SUMMARY OF THE INVENTION

An exemplary implementation of a lawn maintenance device of the present invention is an substantially flat, planar device having a top surface, a lower surface, and a wedge-shaped front section affixed thereto, as hereinafter described, which device is adapted to be attached to a standard push shovel. The top surface of the device is preferably substantially flat, and has a transverse slot therein, preferably between the top surface, and the wedge-shaped front section, into which the blade of a standard push shovel can be placed. The slot is sized so as to accept between 1 to 5 cm. of the lower portion of the blade of the push shovel, and the slot preferably runs the width of the device. The slot has a width just large enough to allow the blade to enter the slot, and can be curved to match the profile of the shovel blade. The device is preferably resiliently held on the blade of the shovel by friction, although screws or other fastening devices can be provided for attaching the device to the shovel.

The wedge-shaped front section of the device of the present invention has a series of vertical tines forming a comb-like structure at the leading edge of the device. The tines preferably extend up beyond the top surface of the device, and preferably, the front, or leading edges of the tines at the front edge of the device, have a curved or arcuate front profile rather than a sharp point. The tine section comprise a series of extending tine portions, separated by open areas cut within the leading surface of the device. Preferably, the bottom section of the open areas has a curved surface.

With these preferred features, the leading edge of the wedge-shaped front section combs through the grass without catching or tearing of the grass stems, or catching on other debris or uneven patches on the lawn.

The lower surface also includes a series of ridges and grooves which are preferably contiguous with the tines and open areas, respectively, of the leading surface of the device. These grooves allow the device to glide over the surface of the lawn, without catching on debris or uneven patches in the lawn. Further, the grooves allow the device to slide through the grass, as opposed to merely sliding on top of the grass in the situation where the bottom surface were smooth.

The grooves of the lower surface, and the open areas of the wedge-shaped front section meet and define an area designated as an inner front edge. While this inner front edge may be a sharp edge, preferably it is also curved or has an arcuate leading edge.

In an exemplary use of the lawn maintenance device of the present invention, the device is fitted to a standard push shovel by inserting the leading edge of the push shovel into the transverse slot on the top surface of the device. The device is then placed on the ground, so that the lower surface of the device is in contact with the lawn surface. The device is pushed forward using the shovel, so that the vertical tines at the wedge-shaped front section pass through the blades of grass. The grooves and ridges on the bottom surface of the device, allow the device to pass easily over any ground obstructions or irregularities such as rocks, roots, or the like, and pass easily over any sort of variation in the lawn surface, such as the edge of the lawn, or uneven patches in the lawn.

Leaves, and any other loose debris on the surface of the lawn, or even leaves and debris partially or completely hidden between the blades of grass and thus beneath the top lawn surface, are first pushed upwards by the tines on the wedge-shaped front section of the device. The leaves and debris then pass over the top surface of the device where they are deflected up into, and then collected against, the blade of the push shovel in a leaf mass. In this manner, the user is able to effectively collect and push the leaves and other debris together into larger piles, which can then be removed, mulched, or incinerated.

In use, the device, which is preferably provided as a one piece unit, attaches to any of a number of different push shovel designs. A unique feature of the present invention is that the vertical tines on the wedge-shaped front section act like a comb to part and separate the blades of grass, and thus remove the leaves and other debris from the lawn. In contrast, the prior art devices typically would roll or slide over the grass, and in the process, flatten the grass and trap leaves and debris within the grass.

Alternatively, the device can be permanently attached to a handle and blade portion so as to provide an integrated device which could be stored in a manner similar to a shovel.

DETAILED DESCRIPTION OF THE INVENTION

Unless otherwise specifically noted, all of the features described herein may be combined with any of the above aspects, in any combination. Also, when used throughout this disclosure, relative terms such as "front", "back", "upper" and "lower" are generally used to describe the device, or the like, when positioned and/or used in its normal operating position.

A key feature of the present invention is that it transforms a simple push shovel into an efficient "push rake". When the push shovel is compared to a standard shovel, it is known to function with greater speed and efficiency. The device of the present invention, performs with the same if not with greater efficiency when compared to a standard rake. When compared with snow, leaves are much lighter and larger in particle size. Therefore the pile of leaves and debris collected at the front of the device can be moved with much less effort than with a standard rake or a leaf blower, which becomes overwhelmed by larger piles or even wet leaves. The design facilitates smooth and guided motion across lawns and other similar surfaces. A preferably elongated lower surface acts like a ski to glide straight through grass surfaces. Combined with the front wedge design, and arcuate leading edge, the present device will separate debris from the lawn and deflect it up the arc of the shovel.

Since this device can be efficiently used by a human operator, the device provides an efficient and environmentally friendly alternative to the use of leaf blowers, or the like.

The device can also act as a grooming tool after a lawn has been cut. Since the increased use of mulching lawnmowers, people have encountered times when the grass is not completely mulched into the lawn and leaves a mound of cut grass on top of the grass surface. The present device will work to remove the larger cut pieces of grass and work to comb in the smaller pieces down to the roots to help return nutrients back to the lawn. The device might also be configured to attach to the rear of a lawn mower, of all sizes, to perform the grooming task simultaneously with cutting.

BRIEF DESCRIPTION OF THE DRAWINGS

Embodiments of this invention will now be described by way of example only in association with the accompanying drawings in which:

FIG. 3 is a bottom view of the device of FIG. 1;

FIG. 4 is a side view of the device of FIG. 1;

DETAILED DESCRIPTION OF THE PREFERRED EMBODIMENTS

Figure 1:
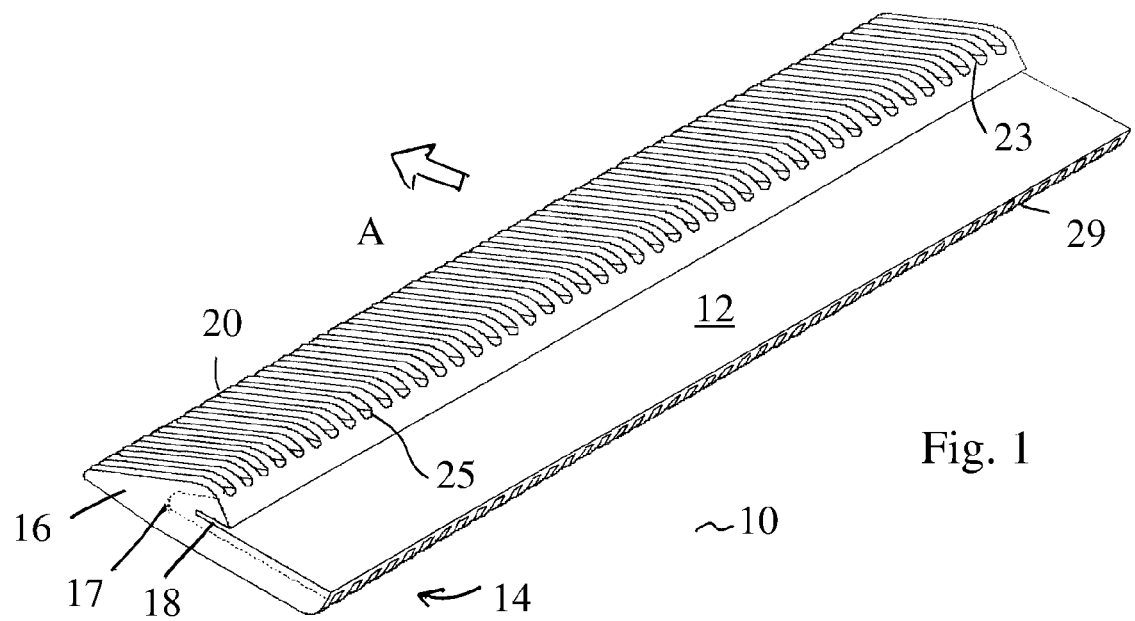
FIG. 1 is a perspective view of the lawn maintenance device of the present invention.
Figure 2:
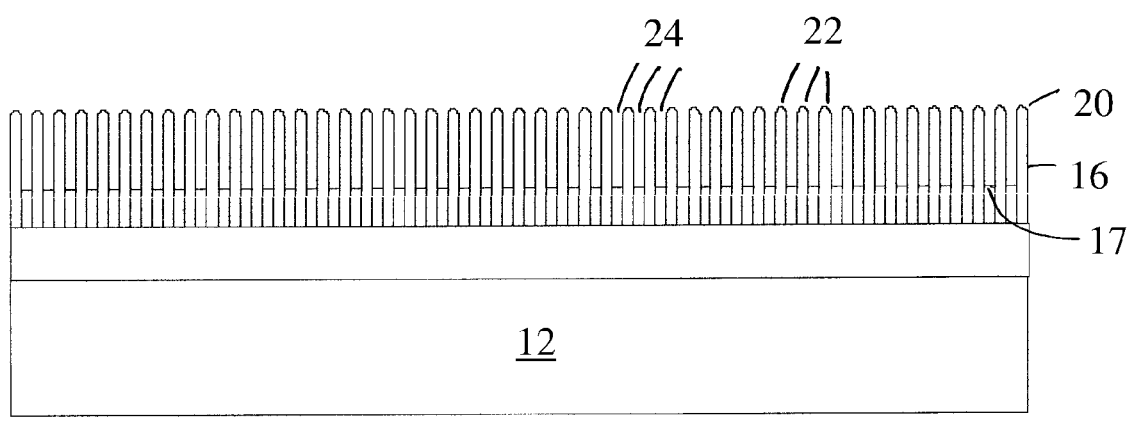
FIG. 2 is a top view of the device of FIG. 1.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

Referring to FIGS. 1 to 4, an exemplary lawn maintenance device 10 of the present invention is shown, and has a top surface 12, a lower surface 14 and a wedge-shaped front section 16. Front section 16 overlaps top surface 12, and forms a transverse slot 18 which extends across the width of device 10. Slot 18 is positioned and sized to as to receive the leading edge of a push shovel, as described hereinbelow with respect to FIG. 5.

At the front edge 20 of wedge-shaped front section 16, tines 22 extended outward, and provide open areas 24 between the tines. Tines 22 preferably are in line with ridges 26 formed on the lower surface 14. The top edges 23 of tines 22 can be any suitable shape including square, while the lower surfaces 25 of open areas 24, are preferably curved or rounded.

Between ridges 26 on lower surface 14, are grooves 28. Each of tines 22, open areas 24, ridges 26, and grooves 28, are all preferably essentially parallel one to the other, and all are in alignment with the direction "A" in which device 10 is pushed during use. The front leading edge 20 of wedge-shaped front section 16, is preferably curved or arcuate in shape so as to avoid having a sharp edge which might catch on various items as device 10 passes through the grass.

Further, when open areas 24 and grooves 28 meet, they form an inner front edge 17, which is also preferably curved or arcuate in shape.

Still further, the lower back edge 29, is also preferably curved in order to allow the device to be easily moved through the grass, even in situations where front edge 20, may be partially elevated, or more easily allow device 10 to be pulled back, when necessary, without catching on the grass blades.

Ridges 26 and grooves 28 preferably extend substantially completely across lower surface 14, in the direction of the intended movement of the device, namely in direction "A".

Two holes 30 are provided in which screws 32 can be inserted in order to at least semi-permanently attach device 10 to a push shovel.

Device 10 is preferably made from a single piece of material. While this could include wood, or metal, preferably, device 10 is fabricated from a resilient plastic material which is sufficiently rigid enough to maintain its shape during use, but resilient enough to minimize the possibility of breakage. Suitable materials for construction include, polyethylene, polypropylene, polycarbonate, polymethylmethacrylate, ABS, or the like.

Device 10 preferably has a width which is approximately equal to the width of a push shovel. Thus device 10 is preferably between 25 and 100 cm in width. The total height of device 10 is preferably between 3 and 20 cm, with a preferred height of between 5 and 10 cm. The depth of device 10, is preferably between 10 and 30 cm, and more preferably, between 15 and 20 cm. However, these dimensions can be easily changed as required to fit a corresponding push shovel, or to minimize the weight of device 10, depending on the construction material.

Tines 22 preferably have a width of between 0.5 cm, and 2 cm, and more preferably, between 0.75 and 1 cm. Open areas 24, preferably have a similar width as tines 22, and in a preferred embodiment, open areas 24 have the same width as tines 24 so as to provide an alternating arrangement of equally sized tines and open areas. The use of metal as a construction material might allow finer tines and open areas to be utilized, while plastic devices likely will require larger tines and the like.

In a preferred embodiment, ridges 26 correspond to the size of tines 22, and grooves 28 preferably correspond to the size of open areas 24.

Further, while the angle of the leading edge 20 of wedge-shaped front section 16 is shown at approximately 30 degrees, this angle can be varied, and can range from 5 degrees to 60 degrees. Preferably, however, this angle is between 15 and 45 degrees, and more preferably, between 20 and 40 degrees.

Also, the shape of wedge-shaped section 16 can vary so as to be slightly concave or convex, or to be more rounded than shown. However, the key feature of the wedge-shaped front section 16 is that it acts to deflect leaves and debris upwards, during use.

Figure 5:
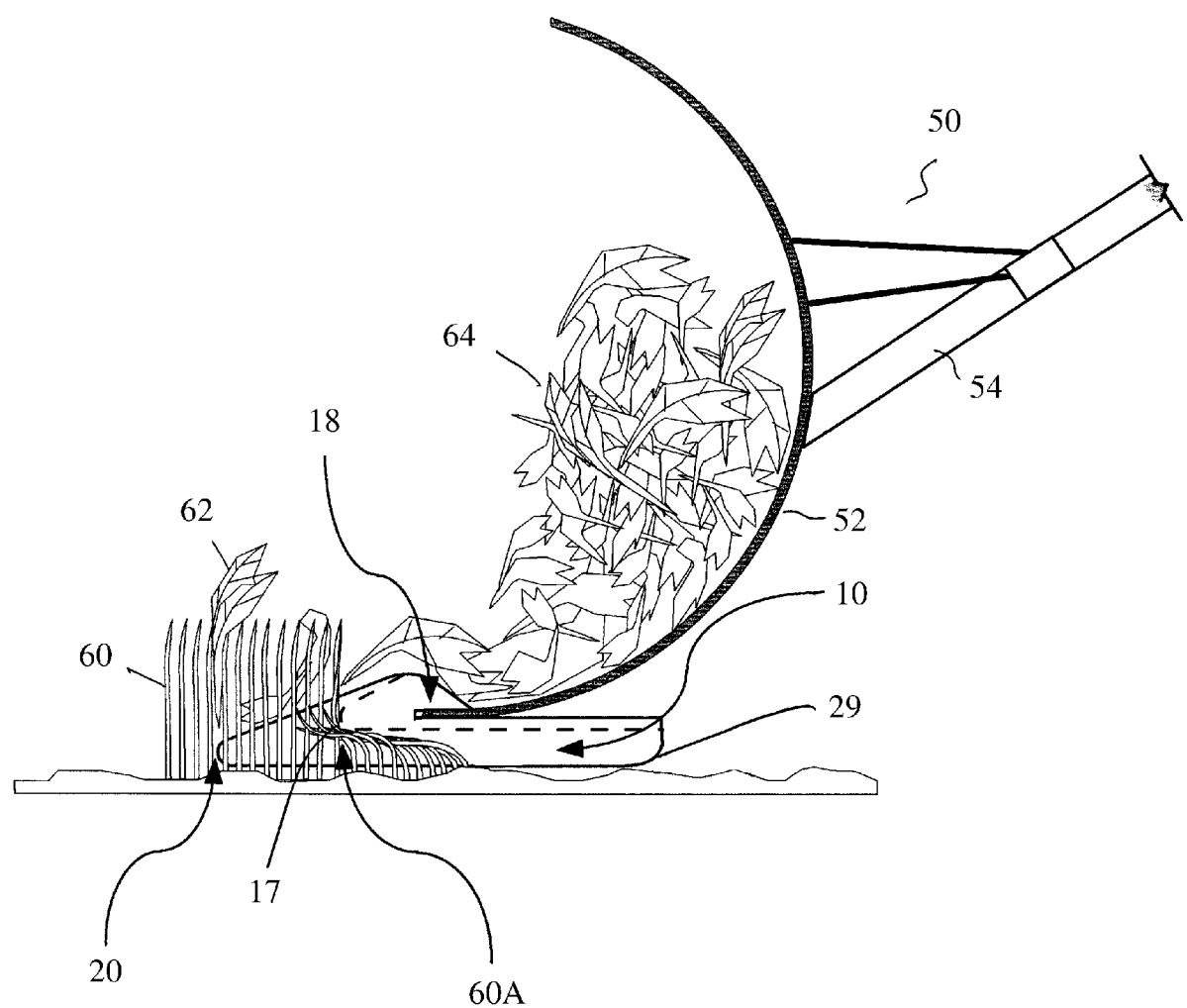
FIG. 5 is a side view of the device of FIG. 1, fitted to a push shovel, and used to push leaves.

In use, as shown in FIG. 5, a push shovel 50, having a generally concave shovel blade 52, and a handle section 54, is inserted into groove 18 where it is either friction fit into groove 18, and/or is screwed in position using screws 32 in holes 30. As the front edge 20 of device 10, is pushed through grass 60, leaves 62 are deflected upwards along wedge-shaped section 16, and then are collected as a leaf mass 64 within the shovel blade. As device 10 slides through grass 60, tines 22 pass through the upstanding grass 60 so as to "comb" the grass. Eventually, the upstanding grass blades 60 are bent over, and slide through grooves 28 on the lower surface 14 of device 10. However, since the bent grass blades 60A pass through grooves 28, device 10 "combs" the grass, rather than merely sliding along the upper surface of the bent grass 60A.

In this manner device 10 can be easily and rapidly pushed across the lawn surface and a leaf mass 64 can be quickly collected. The leaf mass 64 can be easily pushed to a desired location, and the design features of device 10 minimize the possibility of missing leaves within the grass, as well as minimizing the possibility of catching on irregularities such as rocks, roots or the like.

Figure 6:
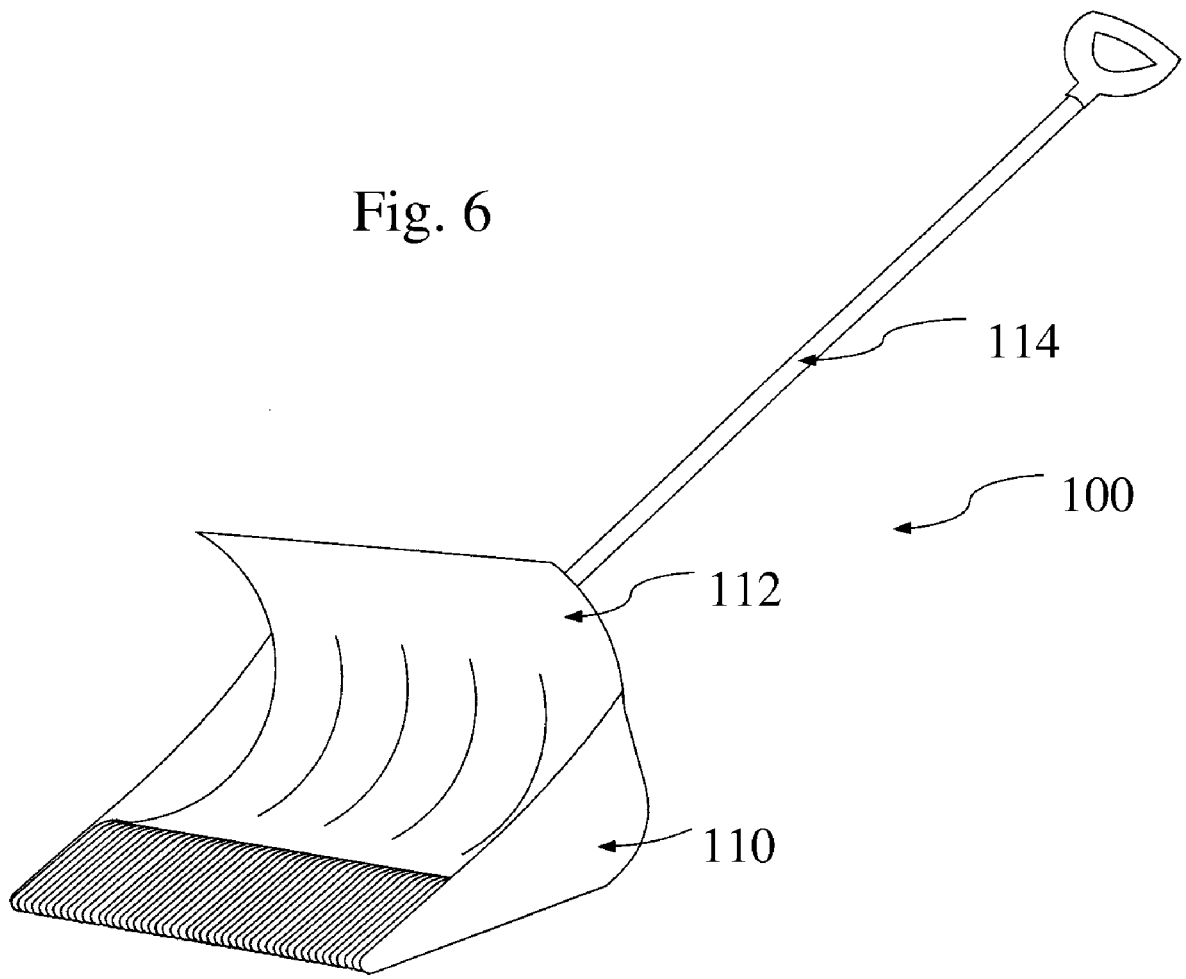
FIG. 6 is a perspective view of a lawn maintenance device of the present invention which is incorporated into an integrated device.

In a further embodiment, the device of the present invention can be made part of a dedicated, or integrated push rake assembly 100, as shown in FIG. 6. In FIG. 6, a lower device section 110 which is similar in construction to device 10, is permanently attached to, or integrally part of, a tool having an inwardly curved, concave blade section 112. Either of the lower device section 110 and/or the blade section 112, can be permanently attached to a handle 114. Using handle 114, lower device section 110 can be pushed through a grassed surface. Similar to device 10, the leaves and debris diverted upwards by lower device section 110 are collected against blade 112. As such, the use of this device is essentially identical to the use of device 10.

For most applications, it is preferred that the device be used in a fashion where it is adapted to be attached to a push shovel. With this option, device 10 does not require significant storage space, and can, for example, be hung on a wall when not required. It can be easily attached or removed from the shovel by releasing the friction fit, or by installing or removing the two screws.

The device of the present invention is also much faster and requires less effort than conventional rakes, and is environmentally cleaner and quieter and handles larger wet or dry loads of debris better than leaf blowers.

Thus, it is apparent that there has been provided, in accordance with the present invention, a lawn maintenance device which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

What is claimed is:

1. A lawn maintenance device for the collection of leaves or other debris on a lawn, which device comprises a substantially flat, planar device having a top surface, a lower surface, and a wedge-shaped front section affixed thereto, wherein:

said top surface of the device is substantially flat, and has a transverse slot therein for receiving the blade of a push shovel;

said wedge-shaped front section has a series of vertical tines forming a comb-like structure at the leading edge of the device, and said tines comprise a series of extending tine portions, separated by open areas cut within the leading surface of the device; and said lower surface comprises a series of ridges and grooves and wherein said ridges and grooves on said lower section are contiguous with the tines and open areas of the wedge shaped front section.

2. A lawn maintenance device as claimed in claim 1 wherein said transverse slot extends across the width of the device.

3. A lawn maintenance device as claimed in claim 1 wherein said device is attached to said shovel by inserting said blade into said transverse slot.

4. A lawn maintenance device as claimed in claim 3 wherein said device is resiliently held on said blade by friction.

5. A lawn maintenance device as claimed in claim 3 wherein screws attach said device to said shovel.

6. A lawn maintenance device as claimed in claim 1 wherein said transverse slot is between the top surface, and the wedge-shaped front section.

7. A lawn maintenance device as claimed in claim 1 wherein said tines extend up beyond the top surface of the device.

8. A lawn maintenance device as claimed in claim 1 wherein the leading edges of the tines at the front edge of the device have a curved or arcuate profile.

9. A lawn maintenance device as claimed in claim 1 wherein said open areas and said grooves meet to define an inner front edge, and said inner front edge has a curved or arcuate profile.

10. A lawn maintenance device as claimed in claim 1 wherein said lower surface has a lower back edge at the rear of said lower surface, and wherein said lower back edge has a curved or arcuate profile.

11. Use of the device as claimed in claim 1 wherein said device is affixed to said blade, said lower section is placed in contact with a lawn surface, and said device is pushed through said grassed surface with the vertical tines at the wedge-shaped front section combing through the blades of grass, so that leaves or other debris on or in said grassed surface are first pushed upwards by said tines on the wedge-shaped front section of said device, and then pass over the top surface of said device where they are deflected up into, and then collected against, said blade in a leaf mass.

12. A lawn maintenance device for the collection of leaves or other debris on a lawn, which device comprises:
a lower device section comprising a substantially flat, planar device having a top surface, a lower surface, and a wedge-shaped front section affixed thereto, wherein said top surface of the device is substantially flat, said wedge-shaped front section has a series of vertical tines forming a comb-like structure at the leading edge of the device, and said tines comprise a series of extending tine portions, separated by open areas cut within the leading surface of the device, wherein said wedge-shaped front section deflects leaves or other debris into a curled blade section; and said lower surface comprises a series of ridges and grooves and wherein said ridges and grooves on said lower section are contiguous with the tines and open areas of the wedge shaped front section;
an inwardly curved blade section operatively connected at a lower end to said top surface of said lower device section, and having a substantially concave surface, for collection of leaves or other debris; and
a handle section connected to said blade and/or to said lower device section for pushing said lower device section through a grassed surface.

* * * * *